United States Patent [19]
Houldsworth et al.

[11] Patent Number: 5,793,754
[45] Date of Patent: Aug. 11, 1998

[54] TWO-WAY, TWO-WIRE ANALOG/DIGITAL COMMUNICATION SYSTEM

[75] Inventors: John Houldsworth; Joseph Ingram Field, Jr., both of Fairfax County; Geoffrey Bollinger Cox, Loudoun County, all of Va.

[73] Assignee: Eurotherm Controls, Inc., Reston, Va.

[21] Appl. No.: 623,849

[22] Filed: Mar. 29, 1996

[51] Int. Cl.$^6$ .................................................. H04B 1/56
[52] U.S. Cl. .................... 370/276; 375/237; 340/870.19
[58] Field of Search .................... 370/276, 204; 375/257, 238, 239, 353; 340/870.19, 870.2, 870.21, 825.06, 825.22, 825.23, 825.57; 364/130, 131, 132, 135, 136, 137, 138, 139, 140, 141, 178, 180, 181, 182

[56] References Cited

U.S. PATENT DOCUMENTS

| | | | |
|---|---|---|---|
| Re. 30,603 | 5/1981 | Grindheim | 324/57 R |
| 3,573,599 | 4/1971 | Rose | 321/2 |
| 3,886,315 | 5/1975 | Lee et al. | 179/18 AH |
| 3,906,338 | 9/1975 | Grindheim | 323/75 N |
| 3,937,882 | 2/1976 | Bingham | 178/69.5 R |
| 3,967,058 | 6/1976 | Moriya et al. | 178/58 R |
| 4,012,590 | 3/1977 | Haas | 178/58 R |
| 4,158,765 | 6/1979 | Shauger et al. | 235/92 NT |
| 4,477,896 | 10/1984 | Aker | 370/276 |
| 4,737,787 | 4/1988 | Ito | 340/870.18 |
| 4,740,952 | 4/1988 | Vernieres | 370/276 |
| 5,142,277 | 8/1992 | Yarberry et al. | 240/827.57 |
| 5,222,084 | 6/1993 | Takahashi | 370/32.1 |
| 5,252,967 | 10/1993 | Brennan et al. | 340/870.02 |
| 5,420,578 | 5/1995 | O'Brien | 340/870.13 |
| 5,657,324 | 8/1997 | Itkin | 370/276 |

*Primary Examiner*—Douglas W. Olms
*Assistant Examiner*—Matthew C. Phillips
*Attorney, Agent, or Firm*—Whitham, Curtis & Whitham

[57] ABSTRACT

A pulse density signaling input/output (PDSIO) scheme is implemented to provide a two-way, two-wire hybrid analog/digital communications system. PDSIO signals are sent as logic pulses from a "master" port to one or more "slave" ports over a twisted pair. From one to a predetermined maximum number of logic pulses are transmitted over two wires at baseband by a master port during a defined period. The modulation used by the master port is pulse density modulation at base band so that the transmitted signal appears to be a d.c. logic signal. The pulses transmitted to the slave port are also used to power the slave port. The slave port communicates with the master port over the same two wires using a pulsed current modulation that multiplexes data on the pulse signals from the master port.

22 Claims, 13 Drawing Sheets

TWO-WAY, TWO-WIRE ANALOG/DIGITAL COMMUNICATION SYSTEM

BACKGROUND OF THE INVENTION

1. Field of the Invention

The present invention generally relates to electrical communications systems and, more particularly, to a two-way, two-wire analog/digital communication system having particular application in industrial control systems. The invention allows full-duplex communication of analog or Boolean values or exception conditions between a controller and one or more controlled devices.

2. Background Description

In general, communication between industrial controlling devices has been either analog or digital in nature. Analog solutions typically require precision components and calibration, while digital solutions typically require a microprocessor. In either case, the components are expensive. Also adding to the expense of industrial communications systems is the interconnection network. In most applications, it is desirable to minimize the number of wires interconnecting ports of the network; however, if full duplex operation is required, the minimum number of wires typically required is two pair, or four wires, one pair for transmission and one pair for reception of signals. What is needed for industrial control communications is a simple, inexpensive solution to the communication problem. It is also desirable to make the signaling look like what field technicians are used to seeing. Typically, this is 4–20 mA signal.

Typical analog communications done through continuous current or voltage control, which is easily viewed using normal analog meters, suffers from noise and the need for tight component tolerance. Digital communications uses binary bits that are not easily interpreted with meters. The approach taken in the present invention is to use a form of pulse density modulation (PDM). A PDM signal looks like an analog signal to an analog meter and may give a useful indication to a voltmeter.

SUMMARY OF THE INVENTION

It is therefore an object of the present invention to provide a full-duplex analog communication system using pulse density modulation (PDM) over just two wires between ports in an industrial control system.

It is another object of the invention to provide a two-way, two-wire communication system for industrial applications which uses inexpensive components.

It is a further object of the invention to provide a two-wire, two-way communication system for industrial controls that operates at a rate that allows the use of existing wiring.

It is yet another object of the invention to provide a signaling scheme to convey real time analog variable information between controllers and actuators using a low cost logic interface or port.

According to the invention, a pulse density signaling input/output (PDSIO) scheme is implemented to provide a two-way, two-wire hybrid analog/digital communications system. PDSIO signals are sent between a "master" port, which is part of a controller, and one or more "slave" ports, to which are connected switches, sometimes called contactors, for process heating and cooling elements, valves and the like, and/or other controllers, over a twisted pair. The PDSIO signals may be considered as time intervals or "bit cells" during which a logic level is represented by current (from the master) or a voltage (from the slave). The logic level can take one of two values, "0" and "1" or "normal" and "exception". From one to a predetermined maximum number of bit cells are transmitted over two wires at baseband by a master port during a defined period.

The modulation used by the master port is pulse density modulation (PDM) at base band so that the transmitted signal appears to be a d.c. logic signal. Pulses are generated by second order delta-sigma ($\Delta\Sigma$) modulation and filtered to recover an analog control voltage proportional to the bit-stream. For general information on delta-sigma modulation, the reader is referred to "Delta-sigma analog-to-analog converter solves tough design problems" by Dan Harres, *EDN*, Apr. 27, 1995, pp. 111 et seq. The pulses transmitted to the slave port are also used to power the slave port. The slave port communicates with the master port over the same two wires using a pulsed current modulation that multiplexes data on the pulse signals from the master port. More particularly, the slave port transmits its data to the master port by varying its load, effectively changing the voltage that the master port sees. Thus, while a controller is transmitting power demand information to a slave port, for example, the slave port is simultaneously transmitting load current, fuse fail, load fail, and/or fault diagnostics back to the controller. Since complete slave port status may be transmitted to the controller over the twisted pair, ammeters, fuse fail indicators and other such instrumentation may be eliminated at the slave port. Such data may now be displayed locally at the controller and/or passed on to a computer.

In order for the slave port to communicate with the master port, the master port must transmit current in at least one bit cell during the predefined period so as to provide both power to the slave port and to provide a signal on which the slave port can impress the data to be sent to the controller. The slave port generates a binary amplitude modulation of the current signal transmitted by the master port during a given period.

According to preferred embodiments of the invention, there are six modes of operation. In mode 1, the master port communicates on/off control signals to up to three slave ports. The slave ports have no microprocessor and, in response to the on/off control signals, each slave port provides a voltage signal impressed on the master port current signal, indicating that the slave port is functioning, or no signal, indicating a slave port failure. In practice, the PDSIO signal from the actuator will be at 0% density for an off state and will be at 100% for an on state. Thus, a simple general fault indicator (GFI) PDSIO device just needs to use the input signal to power itself and to turn on if the input signal is present.

In mode 2, the master port transmits to the slave port control signals commanding, for example, when a heater is to be turned on and off. The slave port has a microprocessor, and provides an uplink transmission proportional to device current. That is, the current of the device is measured, and the value of the measurement is transmitted to the master unit as a PDM signal.

In mode 3, the master port transmits to the slave port control signals which represent, for example, a power level set point. The slave port, which has a microprocessor, locally generates the control to achieve the power level set point and transmits on the up link a signal load current as in Mode 2. All the up link capabilities as in Mode 2 along with the fault detection are included with this mode.

In mode 4, the master port is used to provide a set point to another controller. In this case, the slave sends a Boolean value to the master; for example, hold back. The down link set point transmission is scaled 0–100%.

Mode 5 is for loop powered sensors in which the controller sends loop power to the attached sensor and the sensor sends full bandwidth PDM sensor data on the up link.

Mode 6 is for logic input and is similar to Mode 1 with the down link always indicating an ON state. Loop power is provided in this mode by the master, and a Boolean signal is provided by the slave. Other modes are, of course, possible, as will be apparent from the following detailed description of the invention.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF PREFERRED EMBODIMENTS OF THE INVENTION

Figure 1:
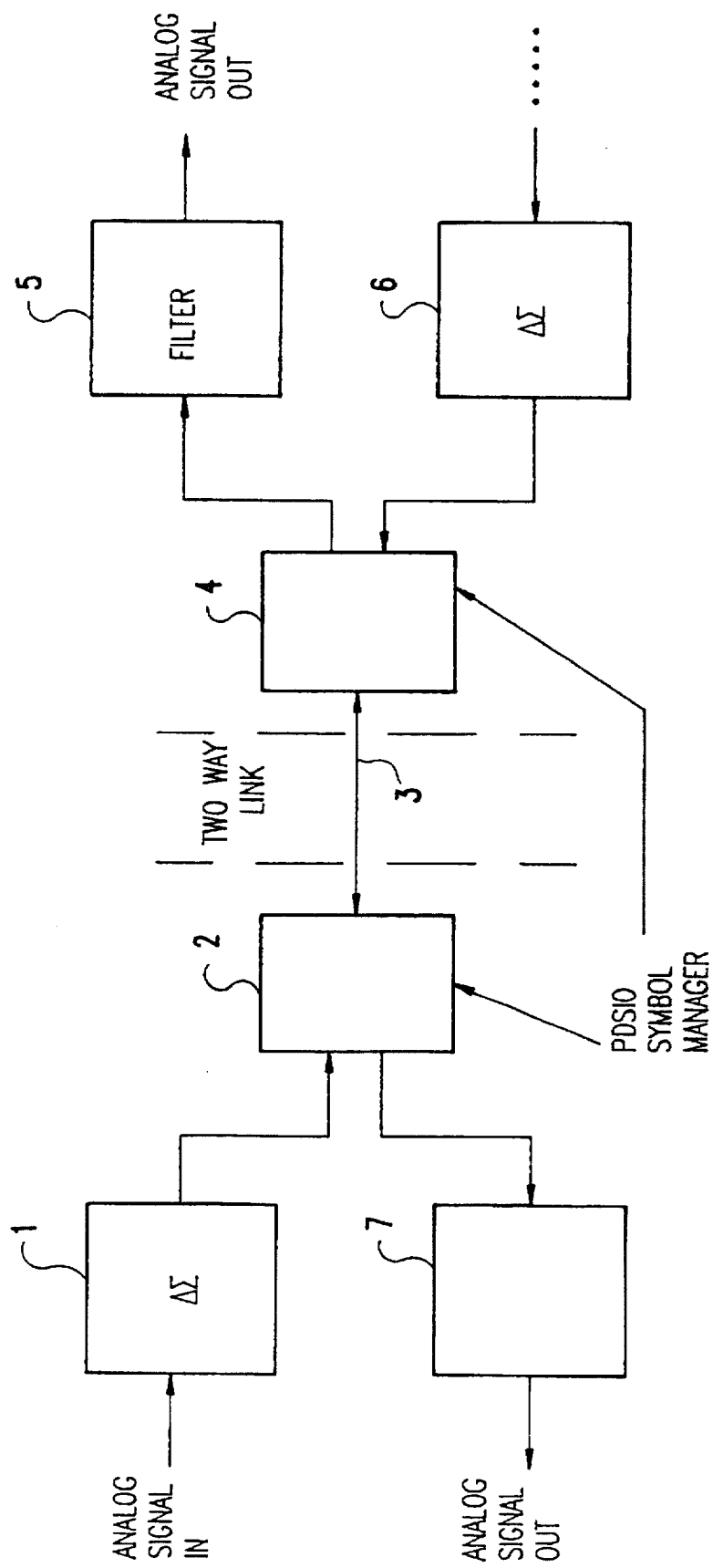
FIG. 1 is a conceptual block diagram illustrating the basic components in a PDM signaling system according to the invention.

Referring now to the drawings, and more particularly to FIG. 1, there is shown a conceptual block diagram illustrating the basic components in a pulse density modulation (PDM) signaling system according to the invention. An analog signal is input to a delta-sigma ($\Delta\Sigma$) modulator 1 which generates a PDM signal. The PDM signal is input to a pulse density signaling input/output (PDSIO) symbol manager 2 which transmits the signal via two-way link 3 to a second PDSIO symbol manger 4 which passes the received signal to filter 5 to recover the analog signal. In the opposite direction, a second $\Delta\Sigma$ modulator 6 generates a PDM signal which is input to PDSIO symbol manager 4 for transmission by link 3 to PDSIO symbol manager 2. PDSIO symbol manager 2 passes this signal to filter 7 to recover the analog signal.

In the practice of the invention, the basic delta-sigma communication scheme is modified to permit bi-directional communication over a two-wire, or twisted pair, link 3. As will be explained in more detail below, a master port at the receiver provides a current during a time interval or "bit cell" to a slave port at the transmitter. This current may take one of two values, for example "0" and "1". The current transmitted over the twisted pair to a slave port at the transmitter serves to power the slave port. The slave port responds by transmitting a voltage impressed on the master port current. This voltage may take one of two values, for example "normal" and "exception".

Figure 2:
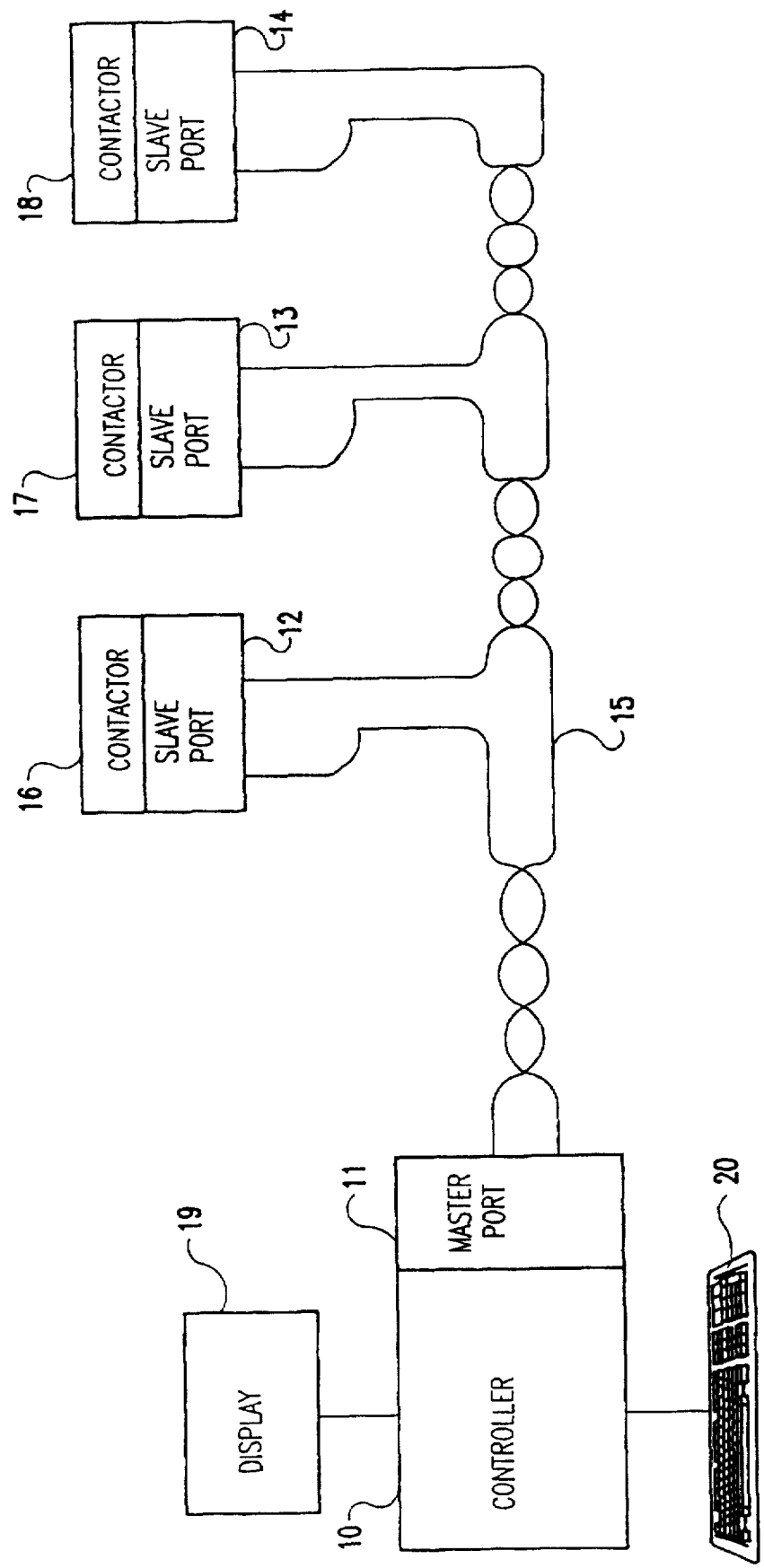
FIG. 2 is a block diagram of an industrial control communication system having a controller with one master port and a plurality of slave ports each connected to a switch, all interconnected in series by a twisted pair.

To illustrate an application of the invention, FIG. 2 shows a block diagram of a representative industrial control communication system having a controller 10 having one master port 11 and a plurality of slave ports 12, 13, and 14. The slave ports 12, 13 and 14 are respectively connected to devices such as switches, sometimes called contactors, 16, 17 and 18. The devices 16, 17 and 18 may be used to turn various controlled devices on and off in response to commands transmitted by the controller 10. The master and slave ports are interconnected in series by a twisted pair 15. The controller 10, which typically includes a microprocessor, provides an output to display 19 and may receive input from, for example, keyboard 20. The display 19 may be colored lights, such as light emitting diodes (LEDs) and/or analog meters. Other input devices may be provided, either in place of or in addition to keyboard 20. Such input devices might be, for example, thumb wheel switches, a joy stick or the like.

Figure 3:
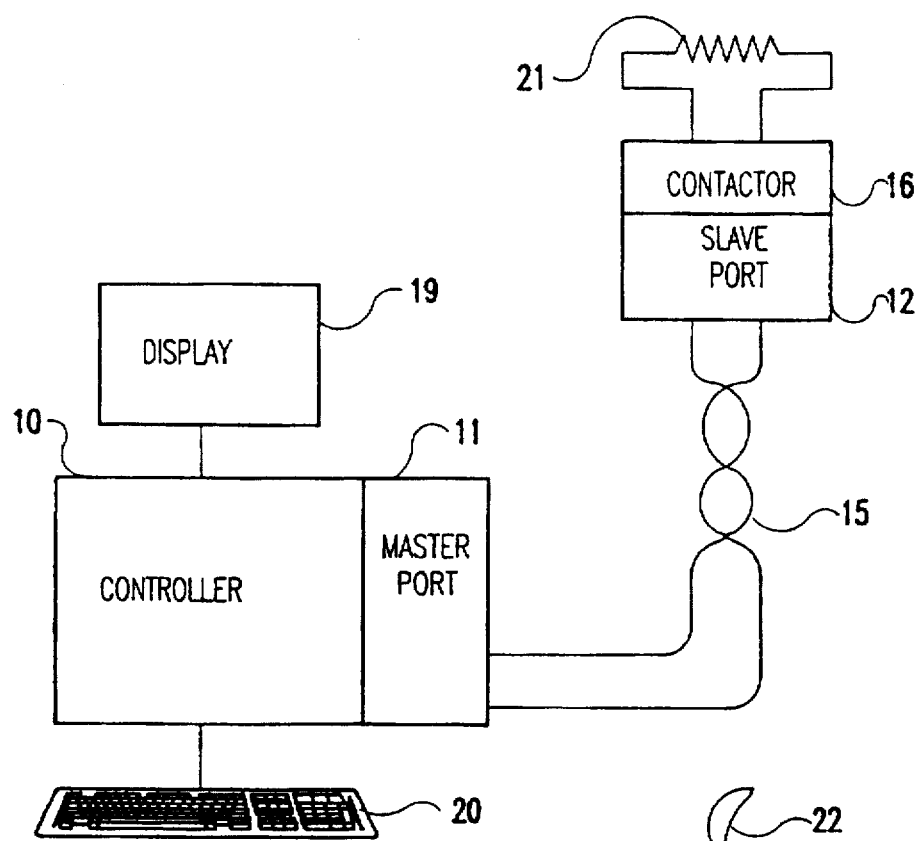
FIG. 3 is a block diagram showing a modification of the control communication system of FIG. 2 in which a master port communicates with one slave port controlling a heating element.
Figure 4:
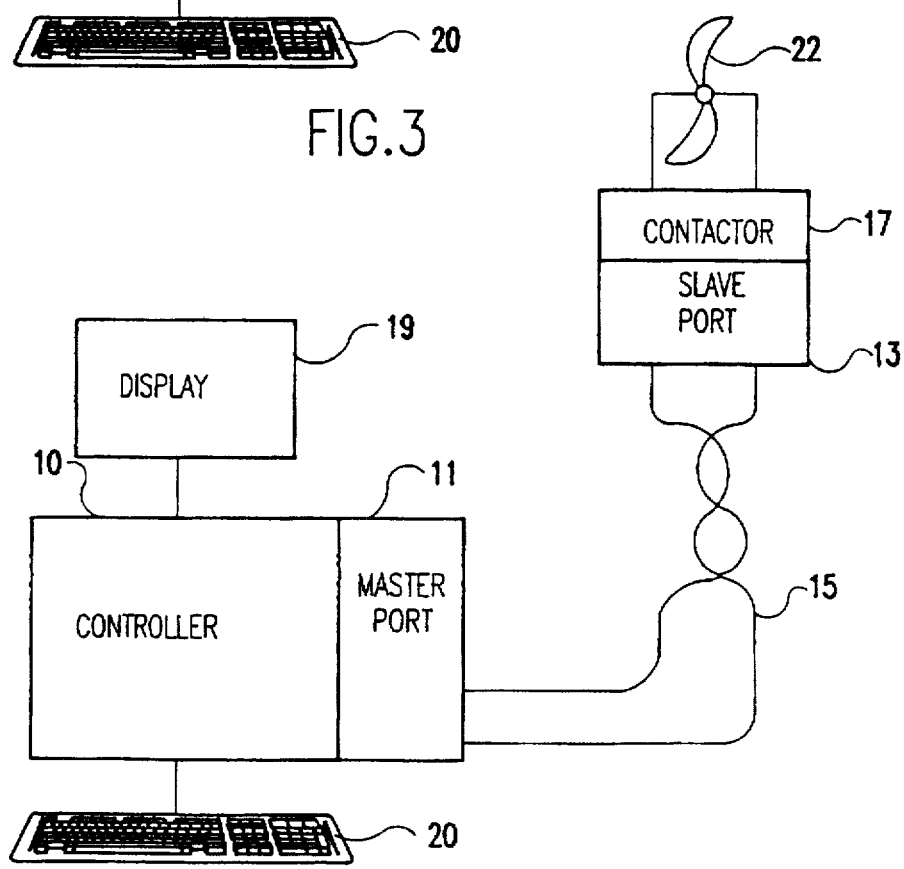
FIG. 4 is a block diagram showing a modification of the control communication system of FIG. 2 in which a master port communicates with one slave port controlling a cooling element.
Figure 5:
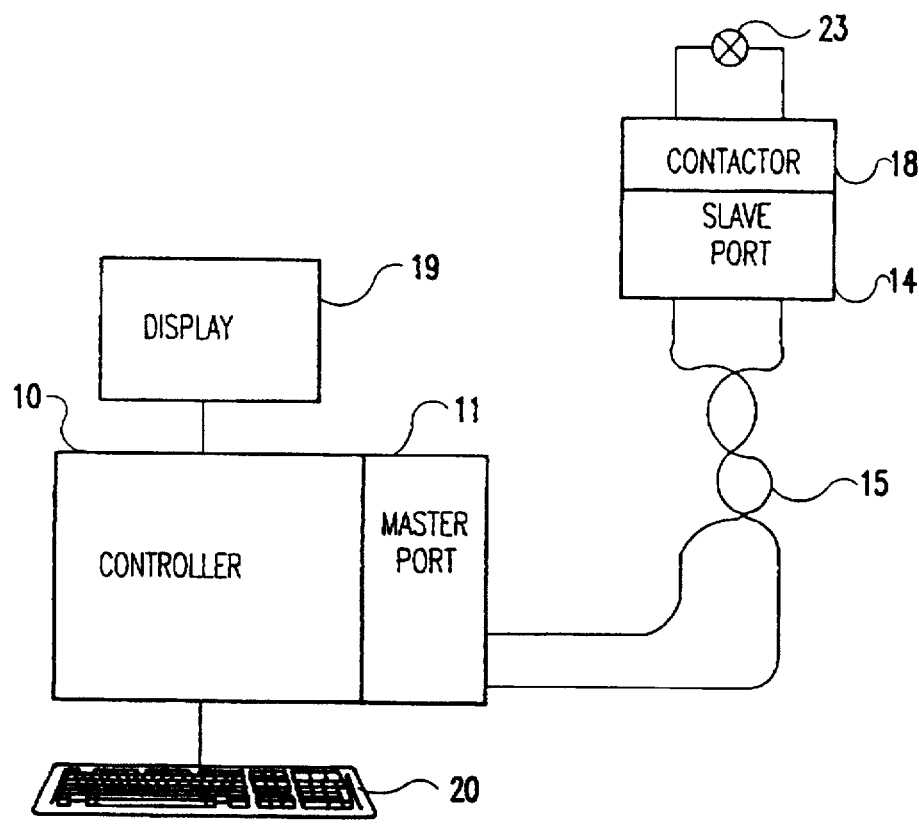
FIG. 5 is a block diagram showing a modification of the control communication system of FIG. 2 in which a master port communicates with one slave port controlling a valve.
Figure 6:
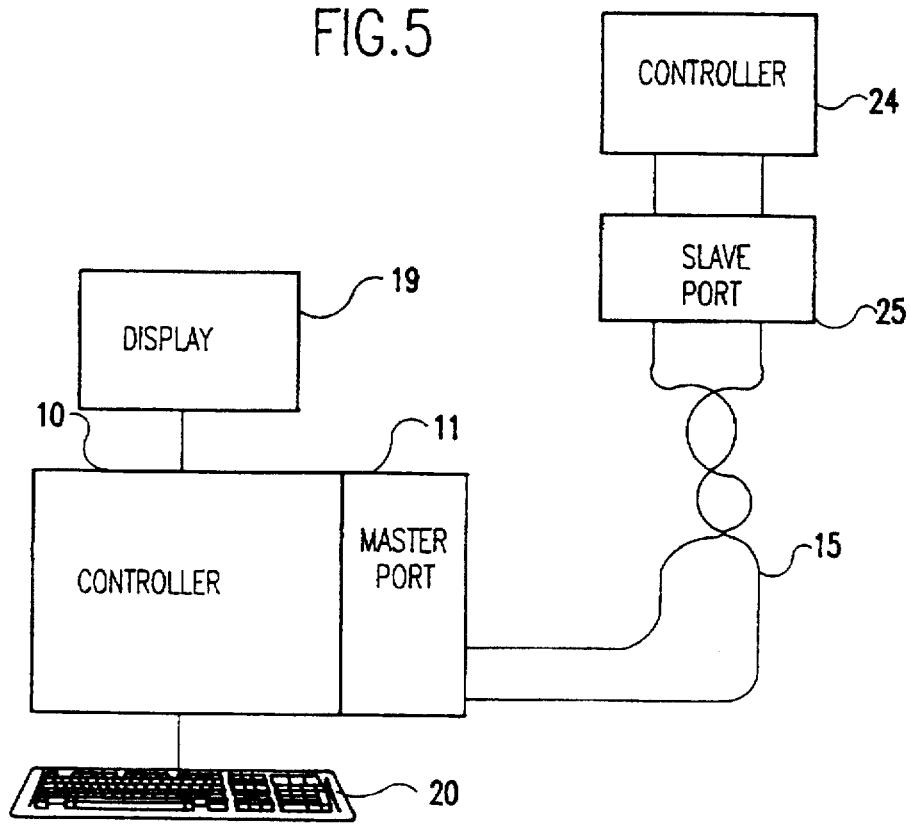
FIG. 6 is a block diagram showing a modification of the control communication system of FIG. 2 in which a master port communicates with one slave port controlling another controller.

In a modification to the system shown in FIG. 2, FIG. 3 shows a controller 10 communicating with a single device or switch 16 controlling a heating or ignition element 21. Such an arrangement might be used, for example, in a building furnace control or a process furnace used in the oxidation process in the manufacture of semiconductor devices. FIG. 4 shows a controller 10 communicating with a single device or switch 17 controlling a cooling element 22. Again, such an arrangement might be used as part of a building heating, air conditioning and ventilation control (HVAC) system or a refrigeration system. FIG. 5 shows a controller 10 communicating with a single device or switch 18 controlling a valve 23. Such an arrangement might typically be used in a chemical process control system to control the pH of a solution, for example. FIG. 6 shows a controller 10 communicating with another controller 24 via a single slave port 25. The master controller in this arrangement may communicate a change in set point to the slave controller which, when operating in a master mode, controls slave elements according to the set point. These control communication systems do not necessarily represent any specific control communication system but are intended to provide a generalized representation of a class of control communication systems in which the subject invention may be practiced.

Figure 7:
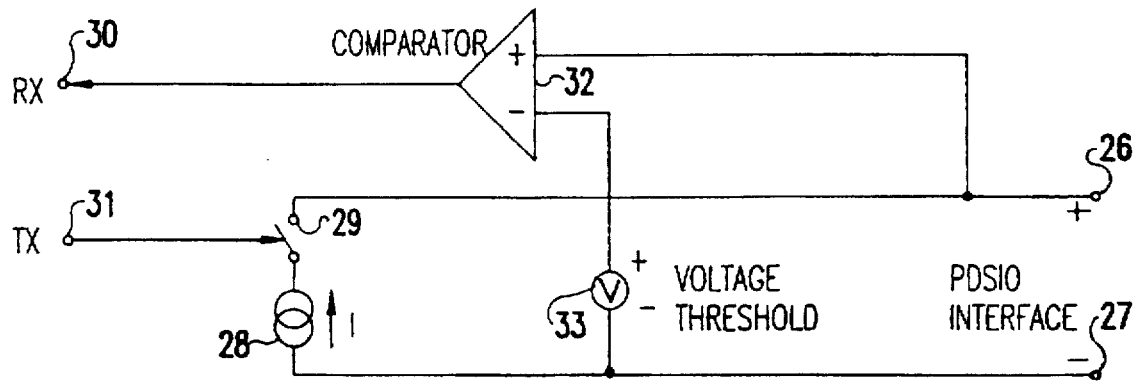
FIG. 7 is a functional block diagram of the master port.

FIG. 7 is a functional block diagram of a master port. The PDSIO interface, represented by terminals 26 and 27, is connected to the twisted pair 15 (FIG. 2). The controller 11 (FIG. 2) is connected to transmit terminal 31 and controls a current source 28 via switch 29 to generate voltage pulses across terminals 26 and 27 which are connected to the twisted pair 15. The master port simultaneously receives data from one or more slave units over the same twisted pair 15. This data is impressed on the pulses transmitted by the master port by a binary amplitude modulation. A comparator 32 compares the voltage on the twisted pair with a threshold voltage 33. This threshold voltage is set to a voltage which is greater than the voltage of a voltage pulse transmitted by the master port but less than the binary amplitude modulation generated by a slave port. When the comparator 32 detects a pulse from a slave port, it provides an output to terminal 30 that is detected by the controller.

Figure 8:
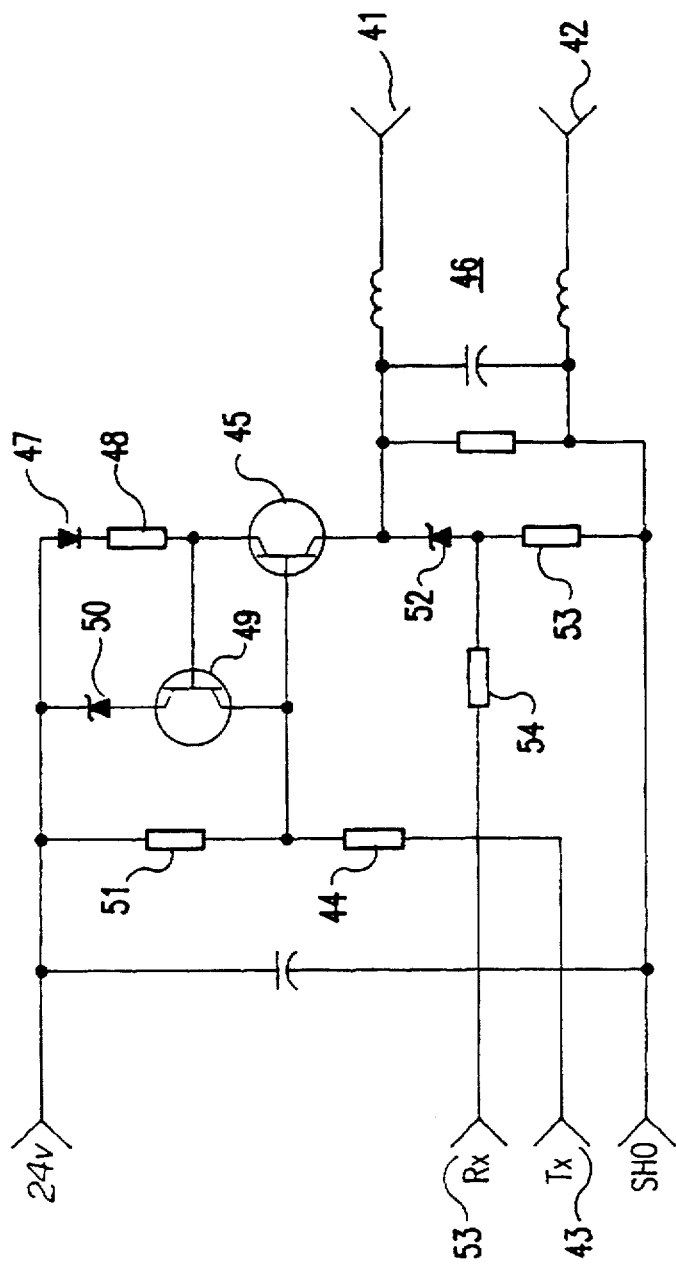
FIG. 8 is a schematic diagram of a specific implementation of the master port shown in FIG. 7.

A specific implementation of the master port is shown in FIG. 8. The PDSIO interface is represented by terminals 41 and 42. The master transmit terminal 43 is connected via resistor 44 to the base of PNP bipolar transistor 45, the emitter of which is connected through radio frequency interference (RFI) filter 46 to the interface terminals 41 and 42. Transistor 45 serves as a switch and as part of the current source comprising series connected diode 47 and resistor 48 to the PDSIO interface. The junction of the collector of transistor 45 and resistor 48 is connected to the base of a second PNP bipolar transistor 49 having its emitter connected to the base of transistor 45. The collector of transistor 49 is connected via a back biased Zener diode 50 to a voltage source, here shown as a 24 V source. An additional resistor 51 is connected between the voltage source and the base of transistor 45 to provide bias to the transistor. The slave voltage level returned on the PDSIO link is level shifted by means of Zener diode 50 to allow the threshold of a standard CMOS gate to determine which of two states is present.

Figure 9:
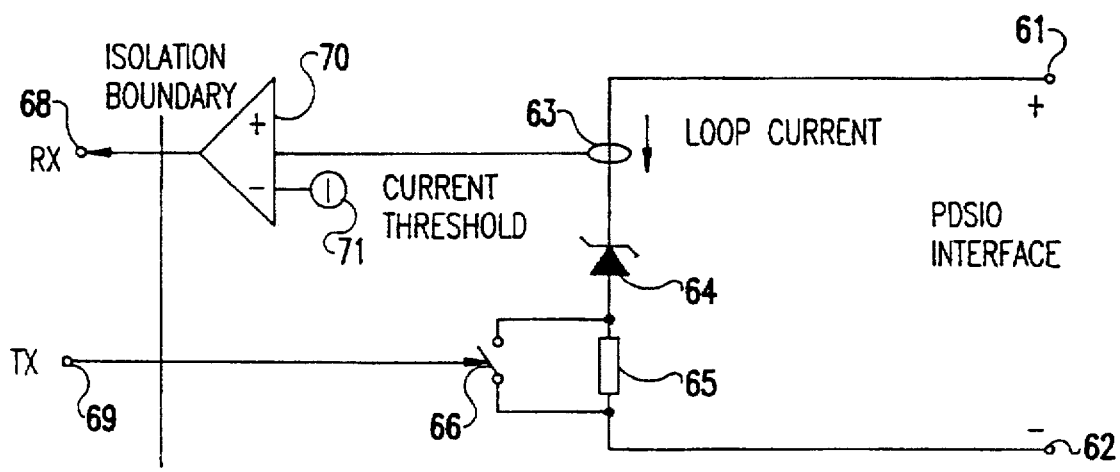
FIG. 9 is a functional block diagram of one of the slave ports.

FIG. 9 is a functional block diagram of a slave port. The twisted pair 15 (FIG. 1) is connected to terminals 61 and 62. A current sensor 63, a back biased Zener diode 64 and an impedance 65 are connected in series between terminals 61 and 62. A switch 66 is connected across impedance 65. The controlled element, for example a switch, is connected to signals 68 and 69. Received base band pulses transmitted by the master port are detected by the current sensor 63 and supplied to one input of a comparator 70. The other input of the comparator 70 is connected to a reference current threshold 71. This current threshold is set approximately midlevel in the current generated by a master port pulse in the current loop formed by the twisted pair 15. Thus, the comparator 70 will provide an output on terminal 68 whenever a pulse from the master port is detected. The slave port, in turn, signals the master port by controlling the switch 66 to either short the impedance 65 or present the full load of the impedance to the master port. The Zener diode represents a fixed voltage that the slave may drop in the signaling state when switch 66 is closed.

Figure 10:
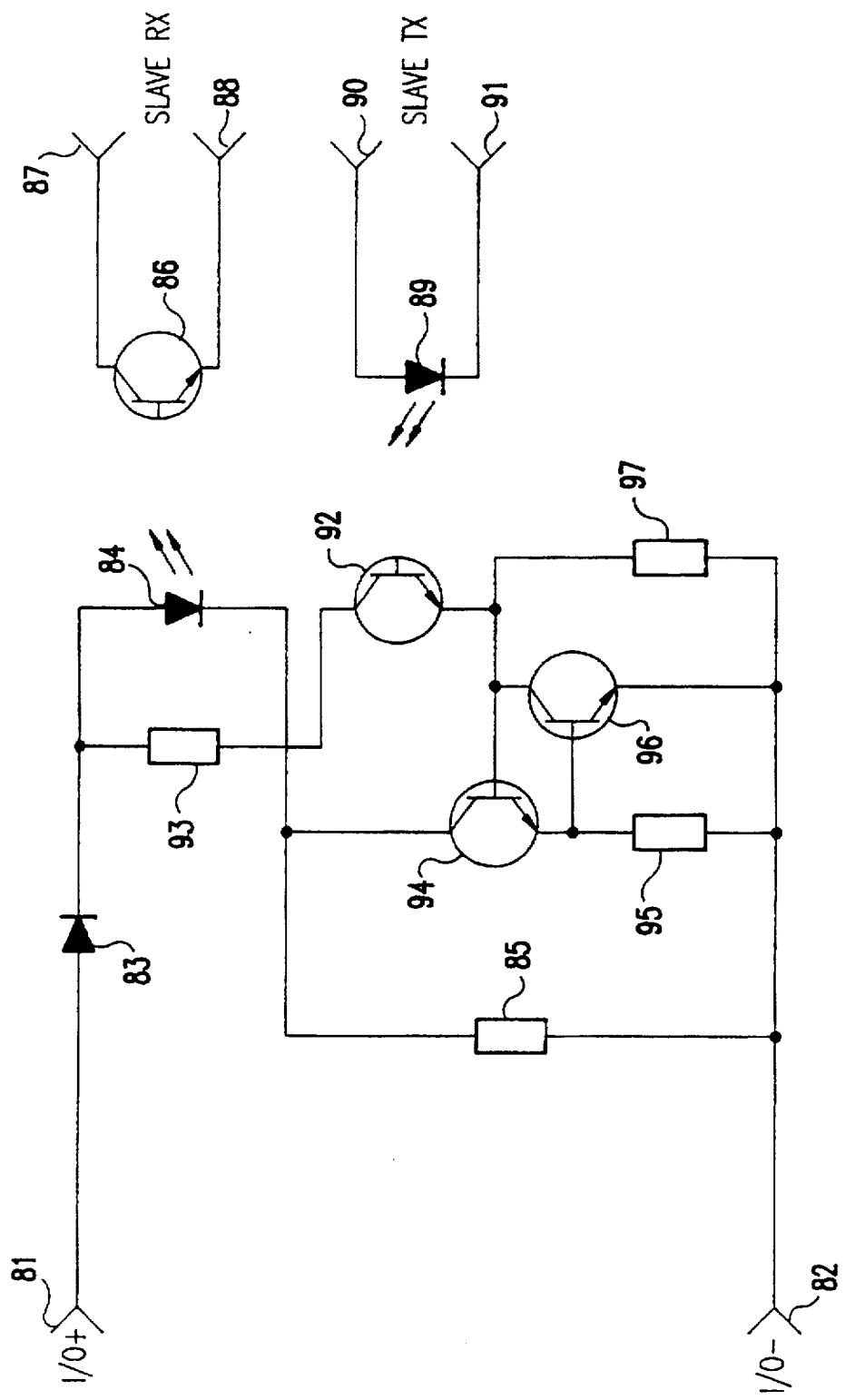
FIG. 10 is a schematic diagram of a specific implementation of the slave port shown in FIG. 9.

FIG. 10 shows a specific implementation of the slave port shown in FIG. 9. The PDSIO interface is represented by terminals 81 and 82. A down link pulse is passed by diode 83 to light emitting diode (LED) 84 having its cathode connected to load resistor 85. Light from LED 84 is directed to photo transistor 86. Transistor 86 is connected across receive terminals 87 and 88. Light from LED 84 causes transistor 86 to conduct, providing the received signal output by the slave port. A second LED 89 is connected across the slave port transmit terminals 90 and 91, and light from LED 89 causes a second photo transistor 92 to conduct. The collector of transistor 92 is connected via resistor 93 to cathode of diode 83, and the emitter of transistor 92 is connected to the base of PNP bipolar transistor 94. The emitter of transistor 94 is connected to a resistor 95 and to the base of a second PNP bipolar transistor 96. The collector of transistor 96 is connected to the base of transistor 94, and a resistor 97 is connected between the collector and emitter of transistor 96. The combination of the photo transistor 92 and the two bipolar transistors 94 and 96 constitute the switch across the load resistor 85. Thus, when the LED 89 is energized, transistor 94 conducts, shorting the load resistor 85, with transistors 94 and 96 and resistor 95 providing a constant current sink.

A PDSIO link according to the invention behaves like a self-powered 4–20 mA current loop where the master port is providing the loop power. One master port may drive multiple slaves by connecting a number of slaves in series up to the fanout limitations of the master port, as generally shown in FIG. 2. The use of series connection is for circuit integrity; that is, all devices become aware of a break in the loop. Further, the series connection permits uplink signaling from a slave back to the master port without disturbing the downlink signal to all slave ports. Analog signaling typically occurs with pulse density between 0.15 and 0.85. Signals outside of this band can also be used. Specifically 0% density is interpreted as No_PDM_Low and can signal an exception. 100% density is interpreted as No_PDM_High and can also be used to signal an exception.

Returning to FIG. 2, in a general fault indicator (GFI) device, each of the slave ports 12, 13 and 14 responds to the pulses transmitted by the master port 11 by modulating those pulses to indicate the condition of the switch. In a multiple slave loop as shown in FIG. 2, any one slave may assert an exception condition without corrupting the down link data from the master. While the master will not be able to identify the slave signaling the exception, the exception will be registered at the master notifying technical personnel of the exception.

Figure 11:
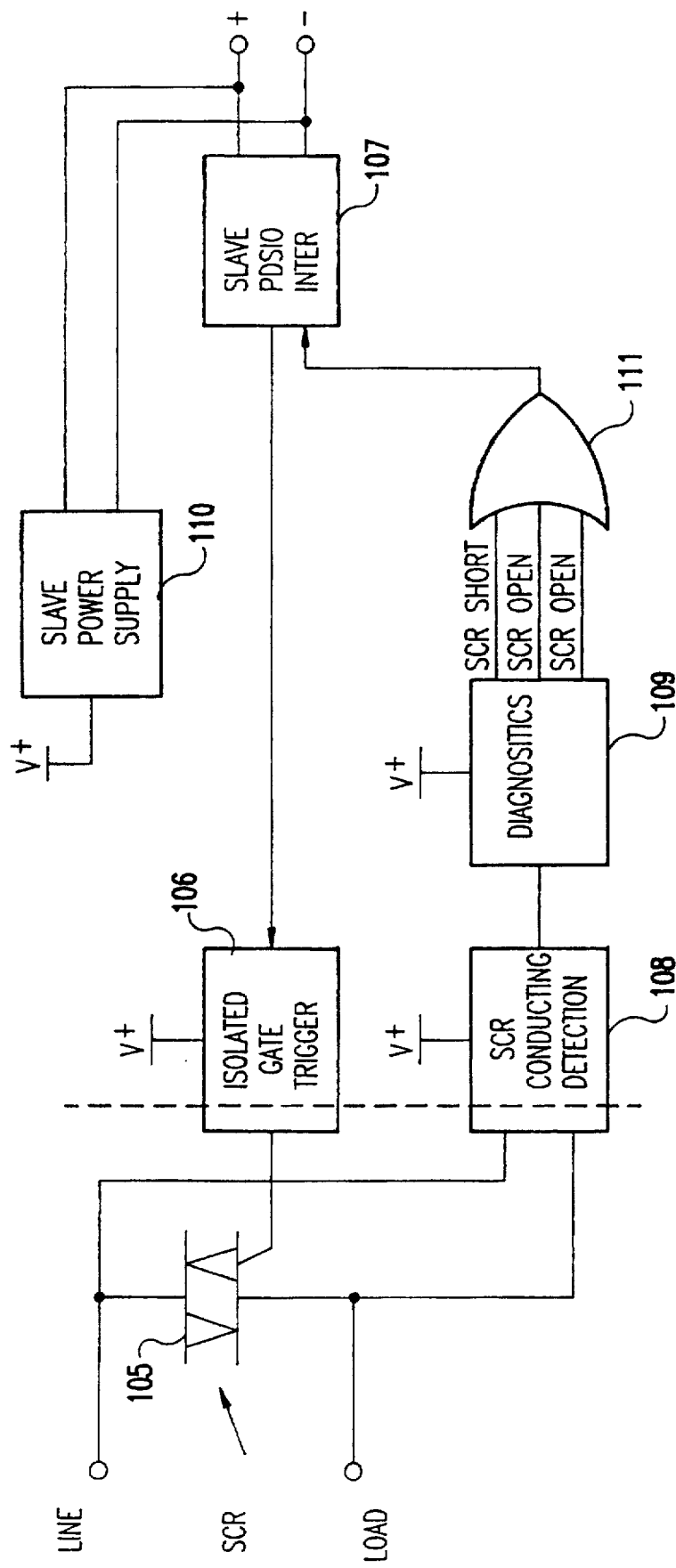
FIG. 11 is a block diagram showing a low cost slave port connected to a switch and operating in Mode 1.

A switch or contactor is typically implemented as a silicon controller rectifier (SCR), as shown in FIG. 11. The SCR 105 is controlled via an isolated gate trigger circuit 106, such as an opto-isolator, via the slave port 107. The SCR 105, in turn, controls current flow from a line source to a load, such as a heater element. Connected across the SCR is an SCR conduction detector 108 that provides an output to a diagnostics circuit 109. Each of the trigger circuit 106, detector 108 and diagnostics circuit 109 are supplied with operating voltage from the slave power supply 110. The slave power supply 110, in turn, derives power for the operating voltage from the pulses transmitted by the master port on the twisted pair 15 (FIG. 2). The outputs of the diagnostics circuit 111 may be any one or none of an SCR short, an SCR open or a load open. These are logically summed in OR gate 111 and supplied as the transmit input (terminals 90 and 91 in FIG. 10) to the slave port 107.

The display 19 in FIG. 2 may, this case, be two LEDs, one red and one green. At start up, the red LED will come on and the uplink to the controller will indicate a failure. This state will remain until a zero-crossing occurs. This is because the SCR 105 (FIG. 11) should not be turned on until a zero-crossing occurs. Furthermore, full diagnostics by the diagnostics circuit 109 cannot be done until the SCR 105 is turned on. At the first zero-crossing, the trigger circuit 106 is turned on, turning on the SCR 105. If the SCR turns on properly, the green LED is turned on and the red LED is turned off. At 48 Hz, a zero-crossing will occur within 10.4 milliseconds. Thus, the master should wait at least this period before checking the GFI state. As long as zero-crossings continue to occur and the voltage across the SCR stays close to zero, the green LED will stay lighted and the uplink will indicate that the switch is functioning properly. That is, the slave port will be sending a zero to the master port by shorting out the load resistor. If the SCR 105 shorts, the load opens or the fuse opens, the red LED will be on. Thus, the display 19 (FIG. 1) outputs are as follows:

| RED | GREEN | STATE |
| --- | --- | --- |
| Off | Off | No Signal |
| Off | On | OK (Red blinks on initially) |
| On | Off | Failed; i.e, SCR Short, SCR Open, Load Open, Fuse Open |

If the SCR 105 fails while the unit is commanded on, the unit will detect this failure. Fault determination is done at each zero-crossing. When the input signal goes away, the unit will stop triggering the SCR. The SCR will turn off at the next zero-crossing.

The pseudocode for the controller 10 (FIG. 2) microprocessor implementing the GFI Mode 1 operation is as follows:

```
main ()
{
/* Wait for the power up RC time constant to
expire*/
while(power_up_ok() !=TRUE)
/* Indicated failure to the master by
illuminating the red LED. The green LED should
be off. Also ensure that SCR is off.*/
gfi_status (FAILED);
red_led(ON);
green_led(OFF);
trigger_opto(OFF);
/*Wait for zero-cross*/
while(zero_cross() !=TRUE);
/*Zero crossing occurred*/
while (input_state () =ON)
{
trigger_opto(ON);
if(zc_integrator()<50%)
{
red_led(OFF);
green_led(ON);
}
else
{
red_led(ON);
green_led(OFF);
}
{
```

Figure 12:
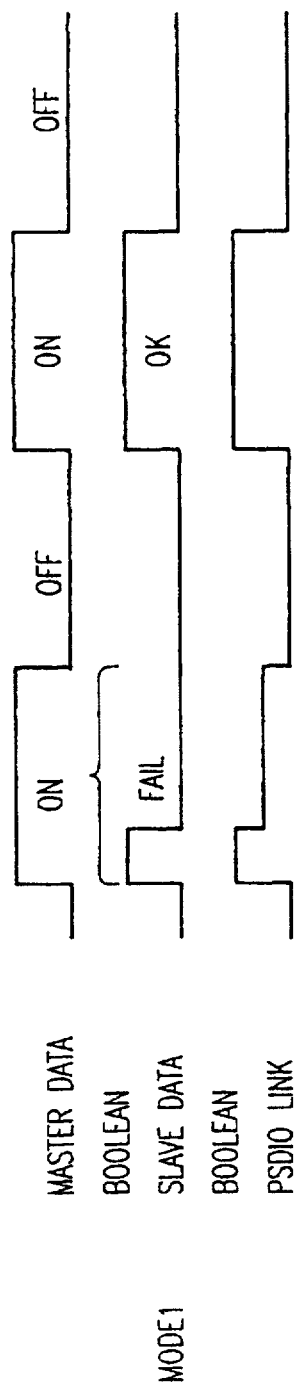
FIG. 12 is a timing diagram showing the PDM signaling by master and slave ports operating in Mode 1.

FIG. 12 shows the timing diagram for the PDSIO link signaling for the invention operating in Mode 1. The master data is basically a Boolean signal commanding ON and OFF times. The slave data illustrates conditions of FAIL and OK. These occur during the ON times of the master data because the slave is powered by the master pulses. The resulting PDSIO link signal is, in effect, a binary amplitude modulated signal wherein the master data signal is modulated by the slave data signal. Thus, the PDM signal on the downlink transmits a control variable and provides timing for the return data.

Figure 13:
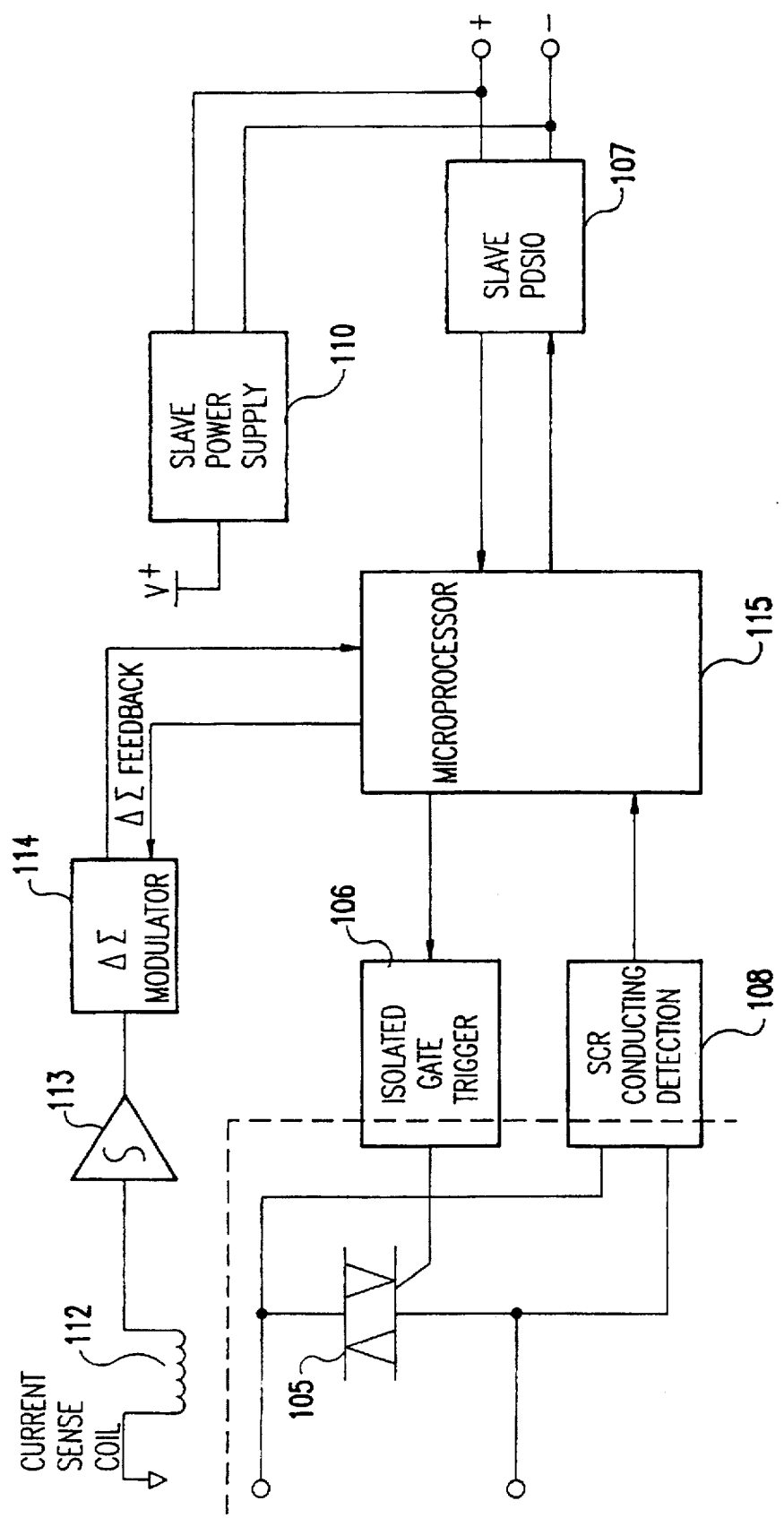
FIG. 13 is a block diagram showing a slave port connected to a switch and operating in Mode 2.

FIG. 13 shows a variation of the switch circuitry as shown in FIG. 11. The SCR 105 is controlled via an isolated gate trigger circuit 106, as before, but the control signal is supplied by a microprocessor 115 in response to a signal from the slave port 107. The SCR 105 controls current flow from a line source to a load, and this current flow is measured by a current sensing coil 112. The current signal from coil 112 is integrated by an integrator 113, which may be a simple RC network, and the output of the integrator is supplied to a delta sigma modulator 114. The delta sigma modulator 114 generates a PDM signal which represents the current flowing through the SCR 105. This PDM signal is input to the microprocessor 115 which, in turn, provides a delta sigma feedback signal to the delta sigma modulator 114. The microprocessor 115 also performs the diagnostics performed by diagnostics circuit 109 in FIG. 10 and provides the appropriate output to the slave port 107. The rest of the circuit is substantially the same as described with reference to FIG. 10.

Figure 14:
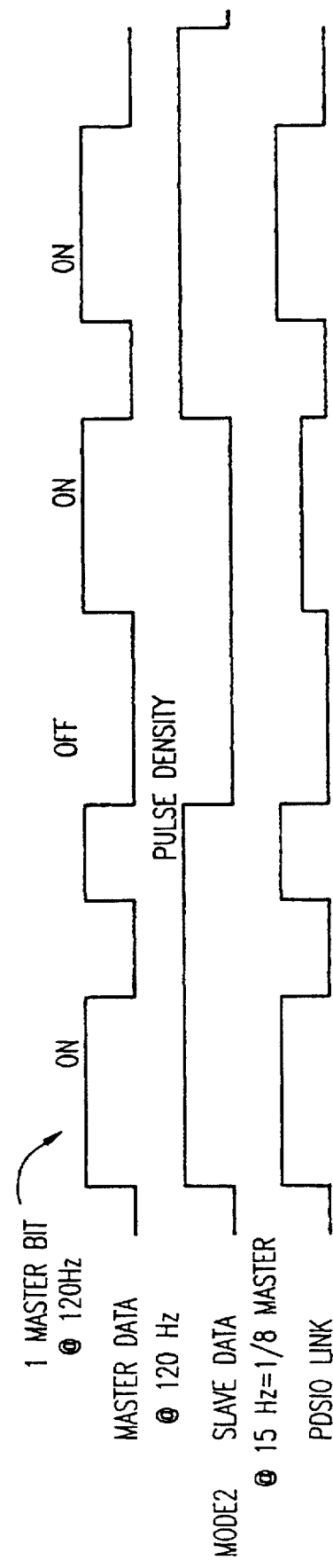
FIG. 14 is a timing diagram showing the PDM signaling by master and slave ports operating in Mode 2.

FIG. 14 shows the timing diagram for the PDSIO link signaling for the invention operating in Mode 2 using the slave system as shown in FIG. 13. The master data is again basically a Boolean signal commanding ON and OFF times. The slave data is a pulse density signal corresponding to the analog value of the measured current. In the specific case illustrated, the master data is transmitted at 120 Hz, and the slave data is generated at 15 Hz, or one eighth the master rate. Note that the slave data is not limited to the ON times of the master data. This is possible even though the slave is powered by the master pulses because the slave power supply 50 provides for capacitor storage of power during the OFF periods of the master pulse signal. The resulting PDSIO link signal is, in again, a binary amplitude modulated signal wherein the master data signal is modulated by the slave data signal.

Figure 15:
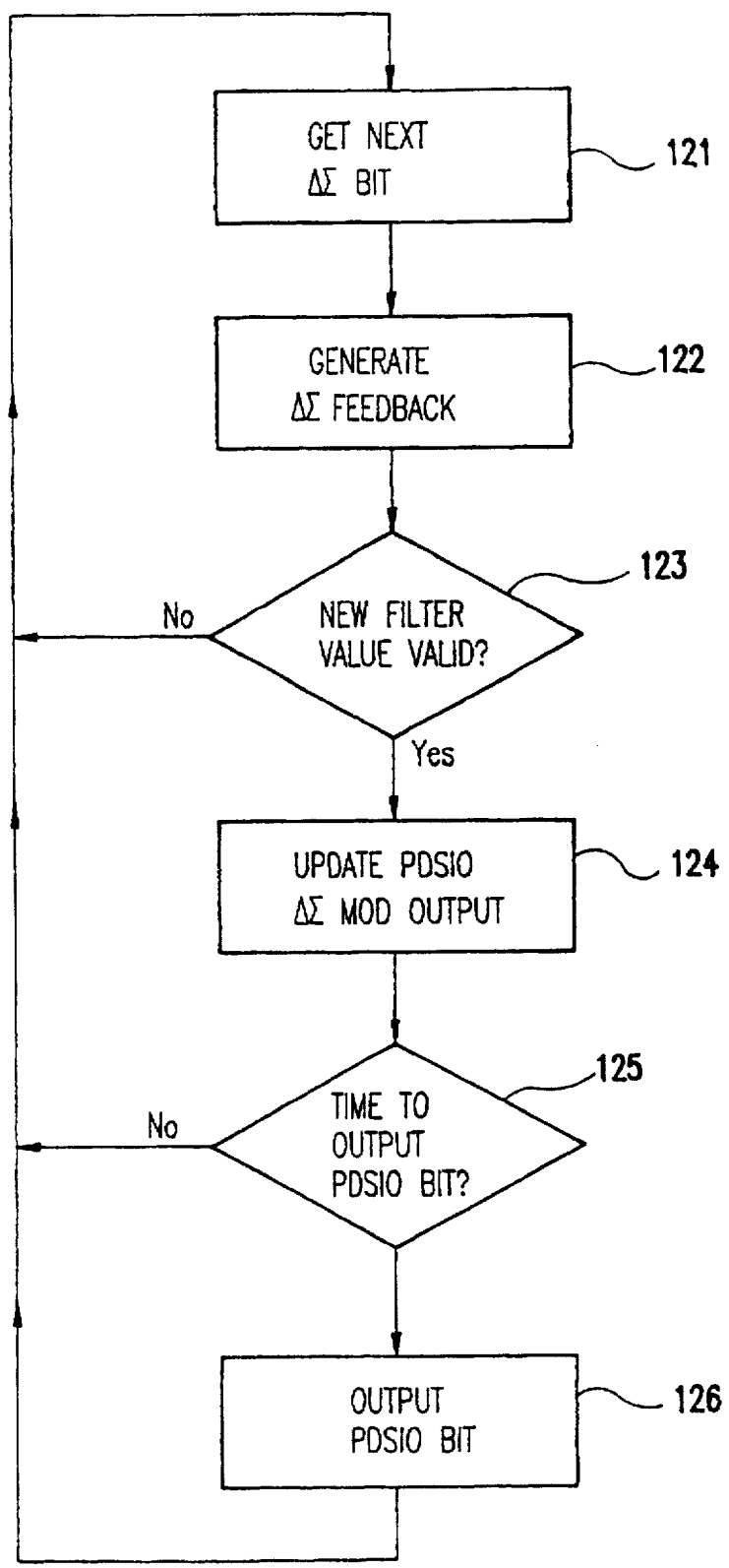
FIG. 15 is a flow diagram of the control program of the microprocessor shown in FIG. 13.

The basic control program of the microprocessor 115 of the circuit in FIG. 13 is shown in FIG. 15. Microprocessor 115 gets the next delta sigma bit from the delta sigma modulator 114 in function block 121 and then generates the delta sigma feedback in function block 122. A test is then made in decision block 123 to check whether the new filter value is valid. If not, the process loops back to function block 121; otherwise, the delta sigma modulator output is updated in function block 124. A check is made in decision block 125 to determine whether it is time to output the PDSIO bit. If not, the process loops back to function block 121; otherwise, the PDSIO bit is output in function block 126, and the process continues.

Figure 16:
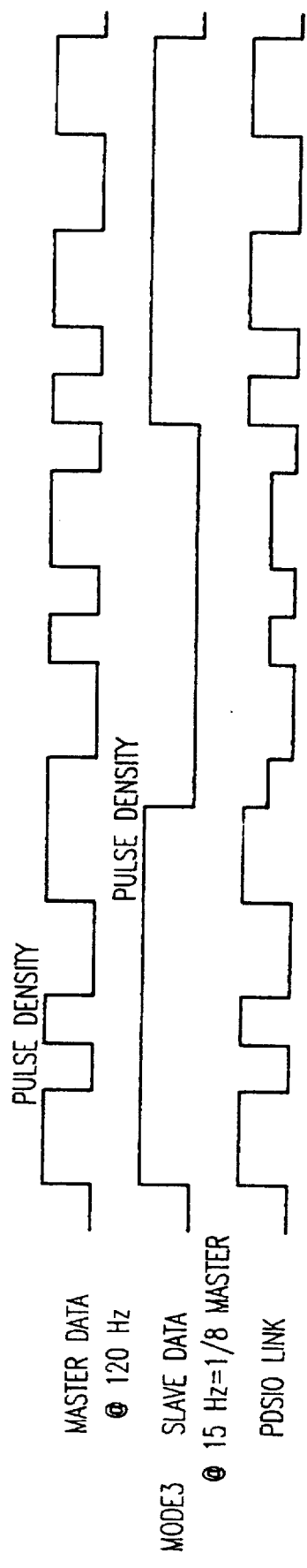
FIG. 16 is a timing diagram showing the PDM signaling by master and slave ports operating in Mode 3.

The same slave circuit shown in FIG. 13 can be used in a different mode, referred to as Mode 3. Reference is made to FIG. 16 which shows the timing diagram for this mode. The basic difference between this mode and Mode 2 is that the master port transmits a pulse density modulation (PDM) signal from the controller rather than a Boolean ON and OFF signal. For example, the master controller may supply a set point (say a temperature) to the slave microprocessor. The master data transmits that set point at the 120 Hz rate. The slave data, as before, is a PDM signal but at the 15 Hz rate. In this case, the slave data may represent a measured temperature. The resulting PDSIO link signal is shown as the modulation of the master PDM signal modulated by the slave PDM data.

Figure 17:
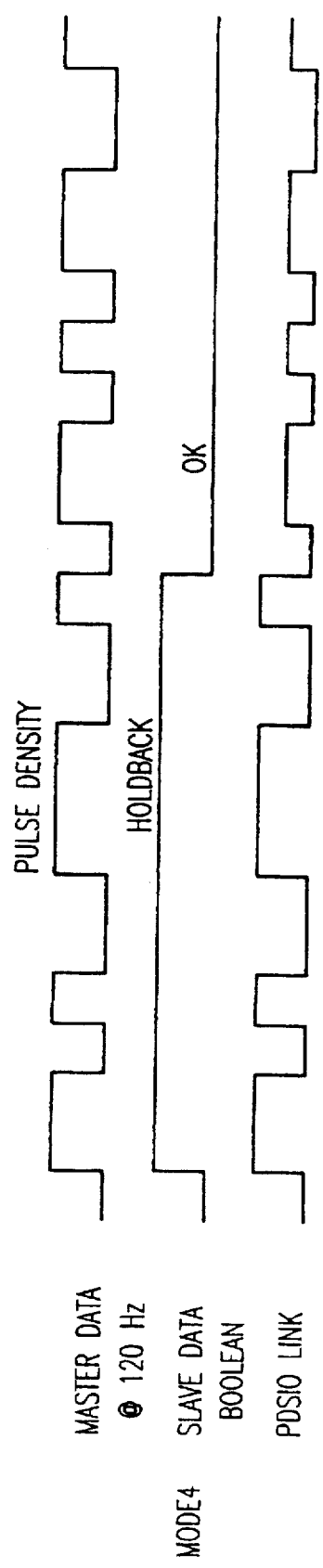
FIG. 17 is a timing diagram showing the PDM signaling by master and slave ports operating in Mode 4.

Mode 4 is used for set point transmission. In this configuration, the controller sends on the down link a PDM analog value representing the set point. The slave responds to the up link with a Boolean signal representing the holdback. This is shown in the timing diagram of FIG. 17. The down link set point transmission is scaled 0–100%. Thus, the controllers at both ends of the PDSIO link need to establish absolute scaling. This is handled at each controller by having a set point transmission/reception mode selection capability.

Figure 18:
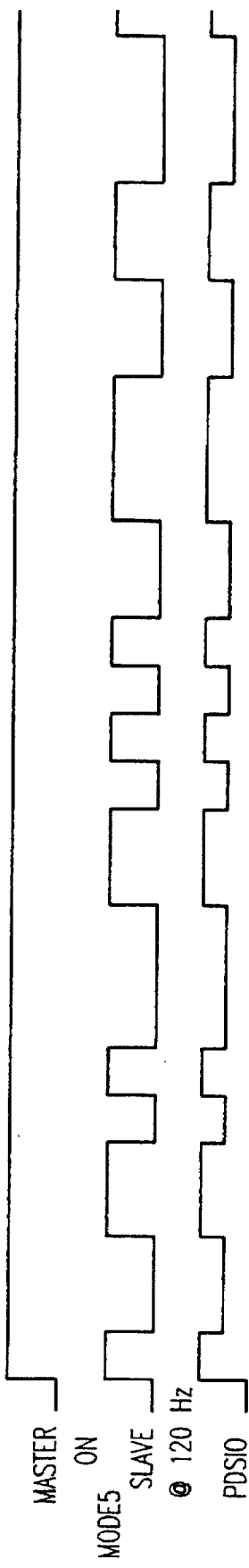
FIG. 18 is a timing diagram showing the PDM signaling by master and slave ports operating in Mode 5.

Mode 5 is used for loop powered sensors. In this configuration, the controller sends loop power to the attached sensor, and the sensor sends full bandwidth PDM sensor data back on the up link, as shown in the timing diagram of FIG. 18. From the controller's point of view, the PDM sensor data could represent a number of different variables. Therefore, the controllers will either have to restrict the acceptable input types or will need to provide scaling and gain, as in d.c. inputs, to account for this. One application of this mode is to allow current measurement using a current transformer.

Figure 19:
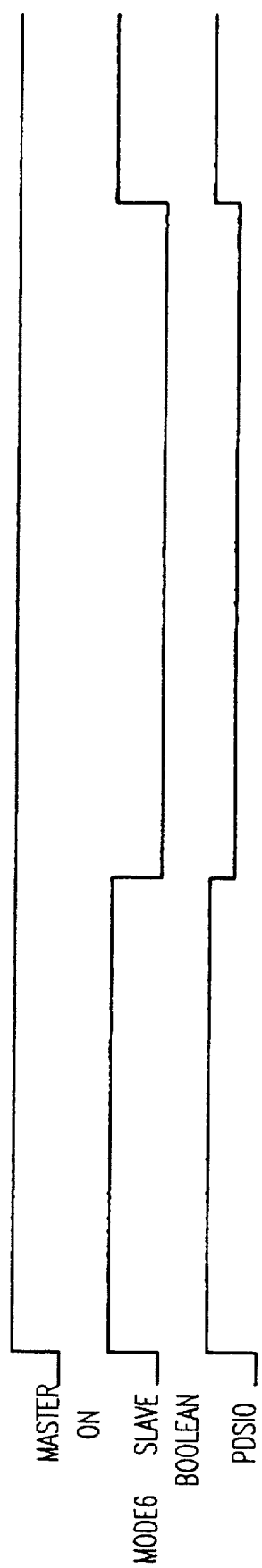
FIG. 19 is a timing diagram showing the PDM signaling by master and slave ports operating in Mode 6.

Mode 6 is for logic input. This mode is similar to Mode 1 with the down link always indicating an ON state. This is shown in the timing diagram of FIG. 19. This configuration provides power to the loop and receives a Boolean signal from the slave. The purpose of this mode is to provide a digital input capability using the PDSIO link. The signal can represent a number of different digital inputs. Therefore, the controllers will either have to restrict the acceptable input types and allow their selection or will need to provide a generic way to handle this data.

As illustrated in the timing diagrams of FIGS. 11 and 16 to 19, there are three forms of return (up link) data that may be transmitted by a slave port; specifically, a Boolean signal, 15 bits/sec PDM (i.e., 120/8 master/slave ratio), and 120 bits/sec PDM. The controller/master needs to establish basic data type information and scaling, units, etc., for the data of a specific application. In general, the controller/master can obtain this one of two ways. The controller/master can be configured with the knowledge of the data types, units, scaling, etc., of the stacks/slaves that are attached. For low cost non-microprocessor based stack/slave devices (FIG. 5), this is a simple matter since the stack/slave devices are operating in Mode 1 and transmitting Boolean signals. Loop powered slaves operating in Mode 1 will assert their up link signal for 3–10 ms after the master asserts the down link signal.

In a multiple slave loop as shown in FIG. 2, only one slave may assert an exception condition without corrupting the downlink data. In the case of downlink analog signaling with the possibility of multiple slave ports responding, the following convention is used:

Slave ports signal using "break" rather than steady state.

The master port, on first detecting the exception (and possible corruption), will send a run of eight zeros or ones (No_PDM_Low flag or No_PDM_High flag, respectively) and then continue with the PDM bitstream.

A No_PDM flag (low or high) is detected at the slave ports by maintaining a buffer of eight bits of incoming bitstream before filtering, allowing the filter to be frozen just prior to it seeing the flag (and possible corruption).

While the invention has been described in terms of preferred embodiments, those skilled in the art will recognize that the invention can be practiced with modification within the spirit and scope of the appended claims.

Having thus described our invention, what we claim as new and desire to secure by letters patent is as follows:

1. A two-way, two-wire analog/digital communication system comprising a master, at least one slave, said slave having a variable load, and a pair of wires interconnecting said master and the variable load of said slave in a loop, said master providing a current excitation to the loop, said excitation being detectable by said at least one slave, said at least one slave responding to a detected current excitation on said loop by generating a signal having one of a first and a second state and varying said variable load according to said signal, thereby communicating the signal as one of a first and a second voltage on the pair of wires to the master simultaneous with the current excitation, and said master detecting the signal from the slave by discriminating between said first and second voltages.

2. The two-way, two-wire analog/digital communication system recited in claim 1 wherein said first and second states represent ON and OFF states.

3. The two-way, two-wire analog/digital communication system recited in claim 1 wherein the excitation to the loop provided by the master has one of a first or a second command state, said at least one slave discriminating between said first and second command states from the master.

4. The two-way, two-wire analog/digital communication system recited in claim 1 wherein said first and second states represent binary symbols, a plurality of said binary symbols representing information.

5. The two-way, two-wire analog/digital communication system recited in claim 1 further comprising a controller connected to said master and a controlled device connected to said at least one slave, said master responding to said controller to provide a switchable current excitation to said loop and said at least one slave detecting said switchable current excitation to provide a control signal to said controlled device and communicate a status signal to said master.

6. A The two-way, two-wire analog/digital communication system recited in claim 5 wherein said first and second states represent ON and OFF states of said controlled device.

7. The two-way, two-wire analog/digital communication system recited in claim 5 wherein said first and second states represent binary symbols, a plurality of said binary symbols representing information on a status of said controlled device.

8. The two-way, two-wire analog/digital communication system recited in claim 5 wherein the excitation provided by the master is a current signal applied to the pair of wires, said slave simultaneously communicating with the master by a voltage level impressed on the current signal from the master, said voltage level being produced by said switchable load.

9. The two-way, two-wire analog/digital communication system recited in claim 8 wherein said master comprises:

an interface connected to the pair of wires;

a transmit terminal connected to said controller;

a current source connected in series with a switch, said switch being controlled by said controller to generate binary symbols at said interface, said master simultaneously receiving data from one or more slaves over the pair of wires, said data being voltage pulses impressed on the binary symbols transmitted by the master; and a comparator connected to said interface for comparing a voltage on the pair of wires with a threshold voltage, said comparator providing an output to said controller based upon the state received from the slave.

10. The two-way, two-wire analog/digital communication system recited in claim 9 wherein a first transistor serves as the switch and as part of the current source comprising series a connected diode and a resistor, further comprising a second transistor and a first Zener diode connected in a feedback path to the first transistor to provide a regulated feedback to the first transistor to insure a constant amplitude current to the interface, said comparator including a second Zener diode providing said threshold voltage as established by a second back biased Zener diode.

11. The two-way, two-wire analog/digital communication system recited in claim 9 wherein said slave comprises:

a pair of terminals connected to the pair of wires;

a current sensor, a voltage reference and an impedance connected in series between said pair of terminals;

a switch connected across the impedance, said controlled element connected to control said switch; and a comparator connected to said current sensor and to a reference current threshold to a current signal transmitted by the master, the threshold current being set approximately midlevel in a current generated by a master pulse in a current loop formed by the pair of wires, said comparator providing an output to the controlled device whenever a signal from the master is detected, said slave, in turn, signaling the master by controlling the switch to either short the impedance or present the full load of the impedance to the master, the voltage reference representing a fixed voltage that the slave may drop in the signaling state when switch is closed.

12. The two-way, two-wire analog/digital communication system recited in claim 11 wherein the switch is a transistor circuit controlled by an optical isolator.

13. The two-way, two-wire analog/digital communication system recited in claim 8 wherein said master comprises:

an interface connected to the pair of wires;

a transmit terminal connected to said controller;

a current source connected in series with a first switch, said first switch being controlled by said controller to generate current pulses at said interface, said master simultaneously receiving data from one or more slaves over the pair of wires, said data being voltage pulses impressed on the current pulses transmitted by the master; and a first comparator connected to said interface for comparing a voltage on the pair of wires with a threshold voltage, said first comparator providing an output to said controller when the comparator detects a voltage pulse from a slave;

and wherein said slave comprises:

a pair of terminals connected to the pair of wires;

a current sensor, a voltage reference diode and an impedance connected in series between said pair of terminals;

a second switch connected across the impedance, said controlled element connected to control said switch; and a second comparator connected to said current sensor and to a reference current threshold to detect current pulses transmitted by the master, the threshold current being set approximately midlevel in a current generated by a master pulse in a current loop formed by the pair of wires, said second comparator providing an output to the controlled device whenever a pulse from the master is detected, said slave, in turn, signaling the master by controlling the switch to either short the impedance or present the full load of the impedance to the master, the voltage reference representing a fixed voltage that the slave may drop in the signaling state when switch is closed.

14. The two-way, two-wire analog/digital communication system recited in claim 8 wherein said controlled device comprises:

a switch connected to supply a current to a load, said switch being controlled by an output of said slave in response to a detected current pulse from said controller;

a conduction detector connected across said switch;

a diagnostics circuit connected to receive an output from said conduction detector, outputs of the diagnostics circuit being any one or none of a switch short, a switch open or a load open;

means for logically summing the outputs of the diagnostics circuit and providing an output to said slave; and a slave power supply connected to said conduction detector and to said diagnostics circuit, the slave power supply deriving power for an operating voltage from pulses transmitted by the master on the pair of wires.

15. The two-way, two-wire analog/digital communication system recited in claim 14 further comprising a display connected to said controller, said display comprising a pair of light emitting diodes indicating a status of said controlled device in response to the logically summed outputs of the diagnostics circuit.

16. The two-way, two-wire analog/digital communication system recited in claim 8 wherein said controlled device comprises:

a switch connected to supply a current to a load, said switch being controlled by an output of said slave in response to a detected current pulse from said controller;

a conduction detector connected across said switch;

a microprocessor connected to receive an output from said conduction detector;

current measuring means for generating a current signal proportional to a current flowing through said switch;

an integrator receiving said current signal and providing an integrated output signal;

a delta-sigma modulator connected to receive said integrated output signal from said integrator and generating a pulse density modulated signal which represents the current flowing through the switch, said pulse density modulated signal being input to the microprocessor which, in turn, provides a delta-sigma feedback signal to the delta-sigma modulator, said microprocessor performing a diagnostics function and providing an output to said slave; and a slave power supply connected to said conduction detector and to said diagnostics circuit, the slave power supply deriving power for an operating voltage from pulses transmitted by the master on the pair of wires.

17. The two-way, two-wire analog/digital communication system recited in claim 16 further comprising a display connected to said controller, said display comprising a display of results of the diagnostic function performed by said microprocessor.

18. The two-way, two-wire analog/digital communication system recited in claim 8 having at least two modes of operation comprising, in a first mode, the master communicating on/off control signals to up to three slaves and, in response to the on/off control signals, each of the slaves providing a signal, indicating that the slave is functioning, or no signal, indicating a slave failure, multiplexed on the master pulses, and in a second mode, the master transmitting to the slave control signals, the slave providing an uplink transmission proportional to a measured device current, the value of the measurement being transmitted to the master unit as a pulse density modulation signal.

19. The two-way, two-wire analog/digital communication system recited in claim 18 having additional modes of operation wherein, in a third mode, the master transmits to the slave control signals which represent a set point, the slave locally generating a control signal to achieve the set point and transmitting on the up link a signal load current and, in a fourth mode, the master providing a set point to another controller.

20. A method of two-way, two-wire analog/digital communication between a master and at least one slave comprising the steps providing a current excitation to the loop by the master, detecting the current excitation to the loop by said at least one slave, responding to a detected current excitation on said loop by the slave generating a signal having one of a first and a second state and varying a load receiving said current based on said signal to form a voltage on said loop corresponding to said signal concurrent with said current excitation, and a detecting by the master of the voltage and thereby of the signal generated by the slave and discriminating between said first and second states.

21. The method of two-way analog/digital communication recited in claim 20 wherein said first and second states represent ON and OFF states.

22. The method of two-way analog/digital communication recited in claim 20 wherein said first and second states represent binary symbols, a plurality of said binary symbols representing information.

* * * * *